United States Patent [19]

Kramer

[11] 3,999,064
[45] Dec. 21, 1976

[54] ANGULAR DISPLACEMENT MEASURING APPARATUS WITH STROBE MEANS
[75] Inventor: Melvin G. Kramer, Riverton, Wyo.
[73] Assignee: The Brunton Company, Riverton, Wyo.
[22] Filed: Sept. 15, 1975
[21] Appl. No.: 613,104

Related U.S. Application Data
[62] Division of Ser. No. 539,820, Jan. 9, 1975, Pat. No. 3,950,859.
[52] U.S. Cl. .................. 250/231 SE; 250/237 G; 340/347 P
[51] Int. Cl.² ........................................ G01D 5/34
[58] Field of Search ..... 250/231 R, 231 SE, 237 R, 250/237 G; 356/169, 170; 340/347 P

[56] References Cited
UNITED STATES PATENTS 3,141,160  7/1964  Hartke et al. ............... 340/347 P
3,525,094  8/1970  Leonard ..................... 250/231 SE
3,531,798  9/1970  Dureau ....................... 340/347 P Primary Examiner—David C. Nelms
Attorney, Agent, or Firm—John E. Reilly; Earl C. Hancock

[57] ABSTRACT

Cell boundary ambiguities associated with data read from tracks of sequential cells from a data source such as a coded disc are avoided by incorporating specially coded cells in each track and sensing the status of these cells to determine the proper timing for enabling accurate readout from the track. The special cells are arranged such that data read therefrom is common at the bit cell boundaries but differs for at least a segment around the center of each bit cell. The specially coded tracks can be arranged to produce significant data as well as to control enabling of the data readout.

6 Claims, 9 Drawing Figures

| DEG | 100 | 101 | 102 | 103 | 104 | 105 | 106 | 107 | 108 | 109 | 110 |
|-----|-----|-----|-----|-----|-----|-----|-----|-----|-----|-----|-----|
| 359 | 0 | 1 | 0 | 0 | 1 | 1 | 0 | 1 | 0 | 1 | 1 |
| 0 | 1 | 0 | 0 | 0 | 0 | 0 | 0 | 0 | 0 | 0 | 0 |
| 1 | 0 | 1 | 0 | 0 | 0 | 0 | 0 | 0 | 0 | 0 | 0 |
| 2 | 1 | 0 | 1 | 0 | 0 | | | | | | |
| 3 | 0 | 1 | 1 | 0 | 0 | | | | | | |
| 4 | 1 | 0 | 0 | 1 | 0 | | | | | | |
| 5 | 0 | 1 | 0 | 1 | 0 | | | | | | |
| 6 | 1 | 0 | 1 | 1 | 0 | | | | | | |
| 7 | 0 | 1 | 1 | 1 | 0 | | | | | | |
| 8 | 1 | 0 | 0 | 0 | 1 | | | | | | |
| 9 | 0 | 1 | 0 | 0 | 1 | 0 | | | | | |
| 10 | 1 | 0 | 0 | 0 | 0 | 1 | 0 | | | | |
| 20 | 1 | 0 | 0 | 0 | 0 | 0 | 1 | 0 | 0 | | |
| 99 | 0 | 1 | 0 | 0 | 1 | 1 | 0 | 0 | 1 | 0 | |
| 100 | 1 | 0 | 0 | 0 | 0 | 0 | 0 | 0 | 0 | 1 | 0 |
| 200 | 1 | 0 | 0 | 0 | 0 | 0 | 0 | 0 | 0 | 0 | 1 |
| 300 | 1 | 0 | 0 | 0 | 0 | 0 | 0 | 0 | 0 | 1 | 1 |

Fig. -8

ANGULAR DISPLACEMENT MEASURING APPARATUS WITH STROBE MEANS

BACKGROUND OF THE INVENTION

This is a division of application Ser. No. 539,820, filed Jan. 9, 1975, now U.S. Pat. No. 3,950,859.

This invention relates to the art of measuring angular displacements relative to a reference line or plane. More particularly, the present invention relates to devices for measuring horizontal angular displacement, vertical angular displacement or both. The invention is particularly useful for indicating angular displacement relative to the polar axis line of an external magnetic field such as is involved in compass operations and also is especially useful for indicating vertical angles relative to the horizontal as is involved in inclinometers or the like.

Prior compass devices have been known for many years. Basically, the compass apparatus includes a magnet which is located in a horizontal plane with a low friction support such as a needle bearing so that the magnet can align itself with the magnetic field associated with the surface of the earth. Pointers and graduated dials are associated with the floating magnet so as to permit measurement of the angular displacement for a given sighting relating to magnetic orientation of the earth's field. For many purposes, visual reading of the compass dials has been sufficiently accurate and are still extensively employed using essentially the same balancing apparatus that has been known for many years.

Various efforts have been directed towards development of improvements in the accuracy of reading of such devices and expanding the applications thereof. For instance, bubble levels have been added to the compass frame to assist in orienting the device horizontally in a more accurate position. In addition, adaptation of compass type devices to vertical angular measurements have also been employed. Such devices are sometimes employed as transits and require some additional means for determining a horizontal reference such as through a supplementary bubble level so that the angle of vertical inclination for a given sighting can be determined visually through cross-hair sights or the like. In addition to the well known application as a navigational aid, these combined compass/transit devices have been particularly useful for rough and preliminary surveys by a wide variety of disciplines such as geologists, civil engineers, foresters, mining engineers and the military. For some such applications, the prior devices suffer from several disadvantages such as reliable accuracy of visual reading especially in an environment of poor lighting as is encountered in mines and at night.

There have been some efforts toward digitizing the readout of compass-type devices. For instance, U.S. Pat. No. 3,746,842 by Fowler shows a gimbal mounted magnetic compass assembly which has a digitally encoded card attached for movement with the magnets. The digital code on the card is read by an arrangement of a light source and a series of light sensitive detectors to control the loading of clock pulses into counter circuitry so that the instantaneous orientation of the magnets can be read by electronic circuitry. U.S. Pat. No. 3,746,842 further suggests including a specially configured strobing control track on the card. Similar coded disc position indicating devices are also shown in U.S. Pat. Nos. 3,772,503 by Fowler and 3,833,901 by Fowler. The use of direct digital displays of the detected digital position defining codes has been suggested in U.S. Pat. Nos. 3,825,823 by Rovner and 3,746,843 by Wesner.

Despite the improvements in the state of the compass/transit/inclinometer art, there has been a continuing need for a device which can be either hand held or used in conjunction with supporting apparatus such as tripods and the like which will provide a repeatably accurate digital indication of angles of displacement relative to an external magnetic field or a horizontal plane. Further, no prior art devices permit the use of a single pivotally mounted assembly and support which accommodates both a horizontal displacement measurement and a vertical displacement measurement. Still further there is need for such a device which will provide for a digital readout to directly illuminate a visually readable numeric display or provide a potential digital read-out for other apparatus or both.

SUMMARY OF THE INVENTION

The present invention incorporates several unique features which cooperate to provide a novel combination advantageously permitting use of common apparatus for indicating either angular displacement relative to an external magnetic field or angular displacement in a vertical direction. One feature of this invention relates to a movable mass mounting configuration which has two stable positions. This feature which is sometimes referred to as a bistable balance permits even or balanced distribution of its weight relative to an axis in one stable position so that magnetic compass operations can be performed without degradation from the balance. The second stable position of this bistable balance involves the shifting of the movable mass so that it is in offset relation to a reference axis thereby permitting use of the balance as a vertical reference line defining means. This further permits direct reading of the compass-type dial for vertical angle measurement.

Another feature of the present invention relates to a dual bearing support arrangement. In one orientation of the frame of the device, this bearing arrangement provides a needle bearing support. By reorienting the device frame orthogonally with respect to the needle bearing support, this dual support feature permits circumferential bearing support relative to the axis of a column attached to the frame of the device. This dual support mounting feature further permits retention relative to the column so as to allow a requisite amount of axial movement while preventing escape of the column relative to the bearing surfaces.

A still further novel feature of this invention relates to the electronic circuitry for determining instantaneous angular displacement of a pivotal assembly relative to the device frame. Digitally encoded apparatus is arranged to track movement of the pivotally mounted assembly and provide an instantaneous readout of digital bits which can be converted to a direct display of the assembly angular orientation or used to transmit data to other apparatus such as remote displays, computers or the like. By use of a disc having sequences of transparent and opaque cells in circular tracks which are arranged relative to light sources and track oriented photo sensitive devices, logic circuitry of the present invention can be employed to insure that no ambiguities associated with transition over radial cell boundaries produces inaccurate position indicating data. Further, a short duty cycle strobing pulse can be employed for actuating the light source so as to minimize potential degradation of compass operations due to current flow but still provide sufficient light passage through the coded disc so that accurate data is obtained. The circuitry further contemplates requiring concurrence between the presence of the light source strobing pulses and the signals indicating that a radial cell boundary transition is not present before allowing digital readout.

The various features mentioned above are arranged in an advantageously cooperative relationship so as to provide a device which can accurately and reliably provide angular displacement data in either horizontal orientation such as are involved in magnetic compass operations or in vertical inclination relative to a horizontal plane. Such a device can be fabricated for portable usage in either a handheld mode or by association with other mounting apparatus. Although direct visual reading of a graduated circular dial is possible, the device can also provide a direct and immediate visual digital readout and/or produce digital information for transmission to another location.

A primary object of the present invention is to provide reliable and accurate measurement of angles of displacement.

A further object of the present invention is to provide an apparatus which can be accurately and reliably employed for measuring angular displacement relative to an external magnetic field or relative to a vertical reference.

A still further object of the present invention is to provide a combined compass and angle of inclination measuring device which can be used to produce direct accurate visual reading of a digital display.

Yet another object of this invention is to provide apparatus for association with a pivotally mounted assembly so that balanced operations can be permitted in one orientation while a vertical reference can be provided while in another orientation.

A still further object of this invention is to provide a dual suspension apparatus which permits low friction bearing supports in either of two displaced orientations.

Another object of this invention is to provide novel circuitry which insures that digital readout of a position tracking device is free of ambiguity.

Yet another object of this invention is to provide apparatus which will permit minimum degradation of a compass operation while still permitting light sensitive reading of position indicating apparatus.

Other objects, features and advantages of the present invention will be more apparent from the following description of the preferred embodiment.

BRIEF DESCRIPTION OF THE DRAWINGS

FIG. 8 is a tabular representation of a significant data relative to the encoding of indicia on a digitally coded disc useful in conjunction with this invention.

DETAILED DESCRIPTION OF THE PREFERRED EMBODIMENT

Figure 1:
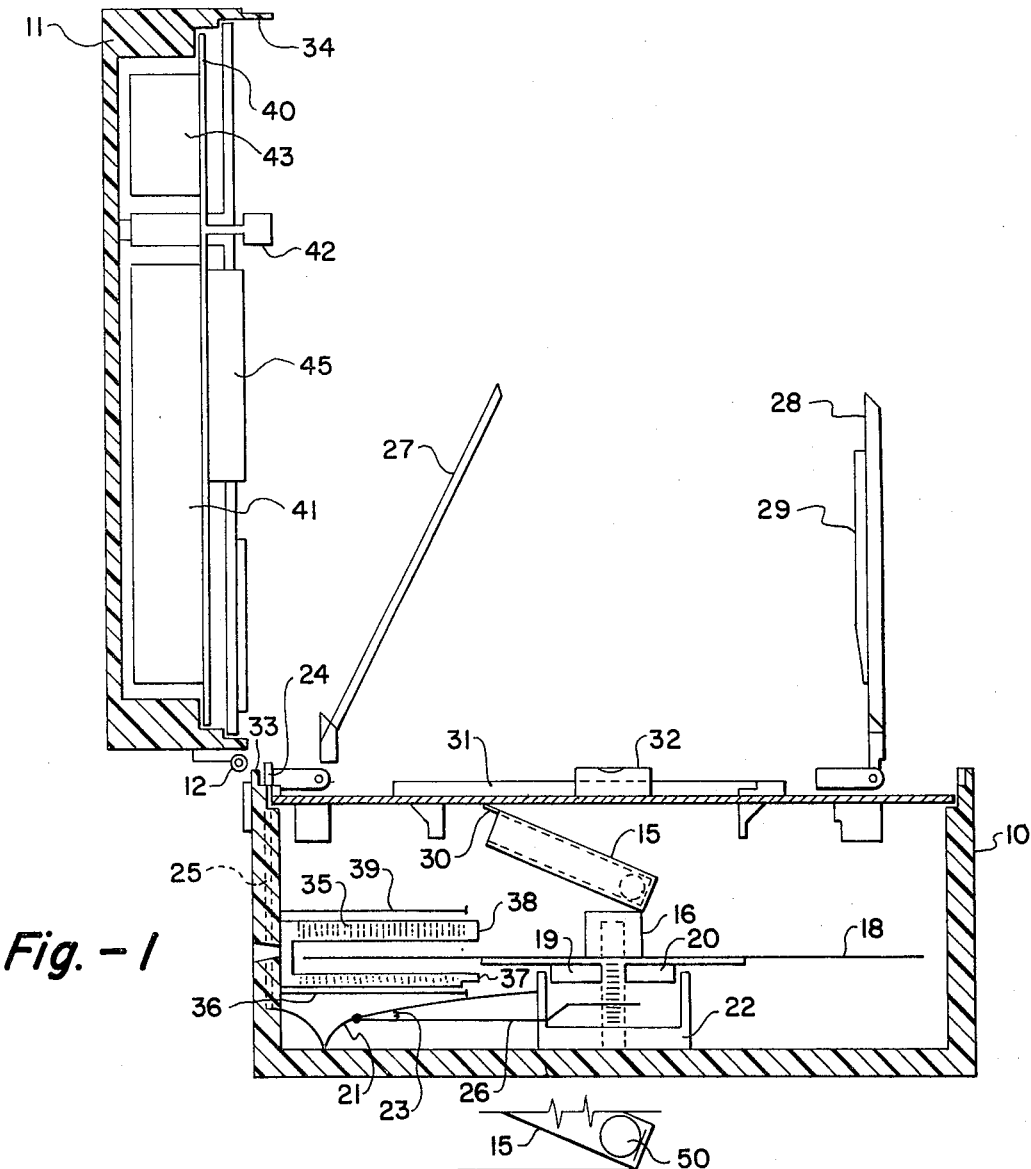
FIG. 1 is a partially sectioned side view of a completed assembly in accordance with the present invention.

FIG. 1 illustrates a partially sectioned view of the preferred embodiment which, as shown and described below, provides an accurate digital readout of compass heading or angle of inclination from horizontal. As shown and described in this exemplary embodiment, the device is a portable combination useful as a compass, transit and/or inclinometer and, although well-suited for use by hand, it clearly can be mounted on other supporting means such as a tripod. Lower casing 10 includes the balancing apparatus and digital encoding structure while upper casing 11 which is hinged to lower casing 10 at 12 contains most of the electronic components and display apparatus. As will be discussed in greater detail below, a bistable balancing configuration 15 is attached to a needle-bearing hub 16 which is in turn attached to digital code disc 18. On the lower side of disc 18 are mounted two magnets 19 and 20 for providing normal compass orientation functions. Magnets 19 and 20 are arranged to rotate within housing 22 which is fabricated of a copper type material to provide induction damping of the movement as is known in the art.

A needle lift pin 24 protrudes above the surface of lower housing 10 and is coupled via rod 25 through the casing and thence to lower arms 21 and 26 to permit clamping of the floating assembly associated with disc 18 as will also be described in greater detail below. Thus the movement of disc 18 can be stopped by pushing downward on pin 24 either manually or when cover 11 is closed.

The upper surface of casing 10 has several elements associated therewith which are essentially the same as has been incorporated in compasses in the past. More particularly, hinged sights 27 and 28 are arranged to permit visual alignment with a distant object and mirror 29 included on sight 28 permits reading of pointer 30 on balance element 15 relative to a circular azimuth ring 31. As is also well known in the art, azimuth ring 31 can be graduated for 360° or in 90° quadrants or both. Leveling bubbles such as 32 can also be included for horizontal and vertical alignment assistance to the user. Azimuth ring 31 is covered with a glass or the like so that the relationship of pointer 30 to ring 31 can be visually observed.

In addition to the unique bistable balancing apparatus associated with this compass/transit, the structure further includes a generally U-shaped member 35 which is attached to the wall of casing 10 so as to project over the digitally coded edge of disc 18. This collar 35 has a plurality of apertures arranged radially relative to disc 18 on each arm 37 and 38. Each aperture of arm 37 is aligned with an aperture on arm 38 so that light from light-emitting devices attached to mounting board 36 can pass through the apertures on lower arm 37, through disc 18 and thence through the corresponding apertures on upper arm 38 so as to be detected by light sensors on upper mounting board 39.

The top casing 11 contains a printed circuit board 40 on which the electronic elements 41 and 43 are mounted as well as an actuating pushbutton 42 and the digital display 45. The digital readout from the light sensors on board 39 resulting from its associated relationship to assembly 35 and the light-emitting devices on board 36 relative to coded disc 18 are coupled to the circuitry within upper casing 11 by a cable (not shown) and converted to digital data to accurately indicate the instantaneous orientation of the device as will be described later.

A diaphragm 33 is also included around the upper edge of the lift pin 24 so as to provide a sealing enclosure for the lift pin device. Diaphragm 33 also restrains the pin and prevents it from falling out of the body of lower casing 10 when the device is inverted. Sights 27 and 28 can be folded downwardly and latch 34 snapped onto its matching element (not shown) on lower casing 10 for storage. As mentioned, the closing of cap 11 also forces lift pin 24 downwardly thus clamping the assembly associated with disc 18 against movement when not in use.

Figure 2:
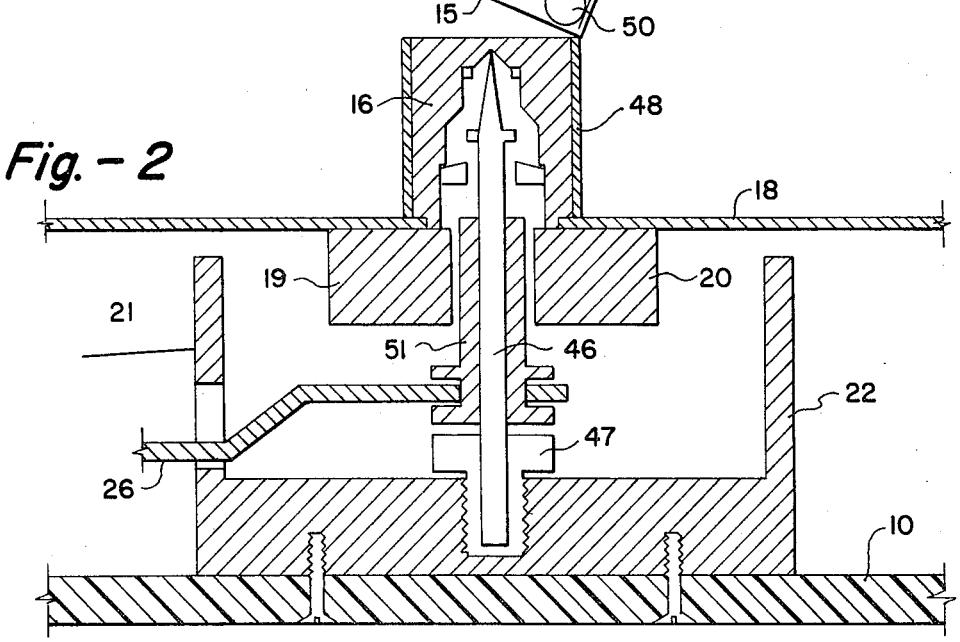
FIG. 2 is a partially sectioned side view of the detail of the dual support mounting apparatus and the cooperatively attached bistable balance.

The structure of the needle balancing apparatus is more clearly shown in the sectioned view of FIG. 2. Copper based housing 22 is bolted to lower casing 10 with sufficient clearance between the upper peripheral edge thereof and disc 18 to permit a certain amount of vertical movement of disc 18 as will be more apparent from the description of FIG. 3. As is known in the art, casing 22 provides induction damping of the disc movements thus reducing the oscillatory effect upon proper magnetic compass orientation of magnets 19 and 20 which are typically composed of Alnico 8 material but could be any type of magnet. A needle pointed column 46 is attached perpendicular to the base of housing 22 by collar 47. Hub 16 in operation is balanced on the tip of column 46 and bistable balance 15 is attached to hub 16 by collar 48. The bistable balance element 15 is preferably formed of a closed tubular member which contains a ball 50. As shown, the balance 15 is attached relative to the axis of column 46 so as to be slightly offset thereby balancing the weight of the remainder of tubular member 15 when the plane of disc 18 is horizontally oriented.

Arm 26 which is ultimately attached via deformable arm 21 and leaf spring 23 to the needle lift pin piston 24 as shown in FIG. 1 is retained in the lower peripheral groove of sleeve 51. Sleeve 51 is arranged so as to be slidable on column 46 but when the upper housing 11 has been opened, arm 26 is spring-biased so as to hold sleeve 51 against the upper shoulder of collar 47. Accordingly, when the casing has been opened and plunger 24 is not being held down, sleeve 51 is withheld clear of hub 16 so that hub 16 and the associated assembly including magnets 19 and 20, disc 18 and balance 15 are normally free floating. Actuation of the lift pin piston 24 either manually or through closing of the casing causes arm 21 to arc upward pulling spring 23 upward thus causing pivotally attached arm 26 to pivot upwardly thereby forcing sleeve 51 against hub 16 clamping it in position.

Figure 3:
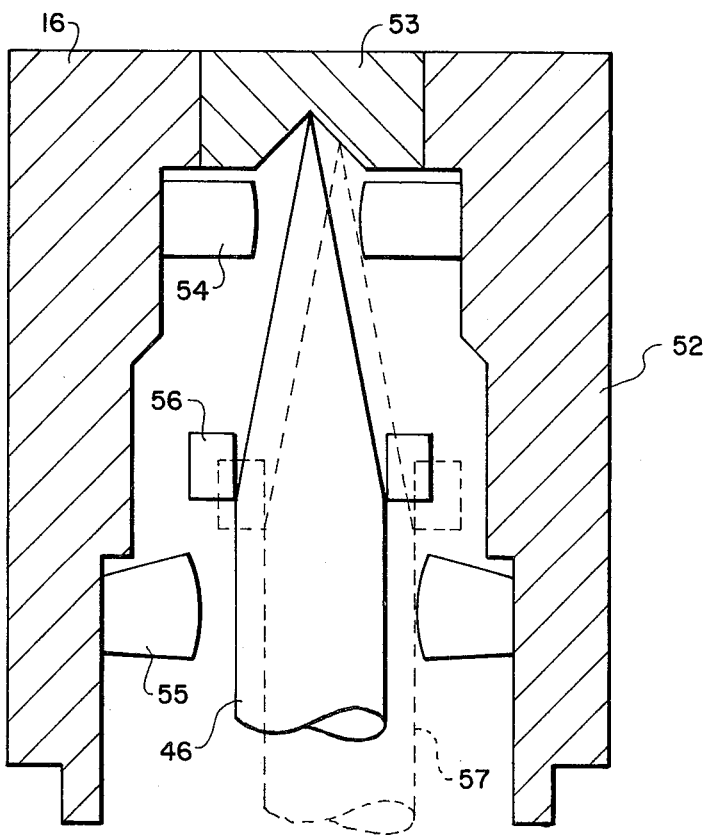
FIG. 3 illustrates the dual supporting apparatus of the present invention.

FIG. 3 shows the interrelationship between mounting hub 16 and needle column 46 in greater detail. Hub 16 is composed of a cylindrical housing 52 which has Vee jewel block 53 attached at one end to receive the needle point of column 46. Ring jewels 54 and 55 are also attached within housing 52 to provide bearing surfaces when the device is being used for vertical angle measurements. The lower sidewall of ring 55 further cooperates with the upper shoulder of sleeve 51 (FIG. 2) to clamp hub 16 when pin 24 is actuated. An additional O-ring 56 is pressfit on the end of column 46 and is composed of any suitable material for permitting a pivotal bearing operation relative to jewel ring 55. Thus, when the device is held so that base 10 is vertical for use in measuring vertical angles, column 46 will shift to the position 57 as shown in dotted lines on FIG. 3 so that the tip of column 46 will engage jewel ring 54, the shank of column 46 will engage jewel ring 55 and the inner sidewall of O-ring 56 will engage the upper sidewall of jewel ring 55 so as to prevent any further lateral movement while permitting free rotation of hub assembly 16 around needle column 46. It should be noted that the position of column 46 and disc 18 which is mounted to hub 16 via attachment to housing 52, is perpendicular (within 3°) for both positions.

The clearances between column 46 and ring jewels 54 and 55 need only be sufficient to accommodate an off-horizontal orientation of about 3° since this has been found to be the general accuracy of most users of such compasses especially with the aid of devices such as bubble level 32. O-ring 56 is sufficiently large to cooperate with jewel ring 55 so as to prevent hub 16 from escaping from its general relationship to needle column 46 while permitting necessary movement therebetween as discussed. Also as mentioned, a full stop engagement is provided between O-ring 56 and jewel ring 55 when the needle lift sleeve 51 has been moved upwardly.

Figure 4:
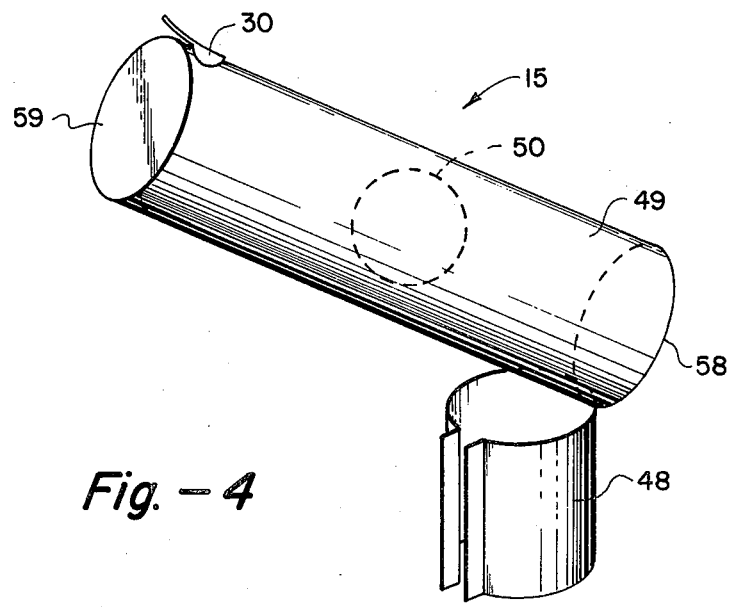
FIG. 4 illustrates the detail of the bistable balancing structure used in the FIG. 1 embodiment.

The detail of bistable balance 15 is shown in FIG. 4. Collar 48 is preferably formed of a single piece with an extension to provide one end plate 58 for the tubular column 49 containing ball 50. The assembly is completed by an additional cap 59 which seals the other end. Thus, when balance 15 is held so that the axis of collar 48 is substantially vertical, ball 50 will move until it rests against plate 58 thereby providing a balance relative to the needle point of column 46 as has been mentioned relative to FIG. 2. This orientation permits normal operation of the magnets 19 and 20 as a compass balance. However, orientation of the axis of collar 48 so that it is substantially horizontal will cause ball 50 to move to the opposite end until it rests against plate 59. By so doing, balance 15 thus will effectively be providing a vertical reference for hub 16 and disc 18. Ball 50 can be fabricated from any suitable material, lead having been found to be acceptable. The balance 15 is fabricated from any suitable material for providing a relatively rigid assembly, a metal collar 48 and end cap 58 bonded to a plastic column 49 and plastic end cap 59 having been found to be satisfactory. The main criteria is that the mass contained within balance 15 must be shiftable between two stable positions and balance 15 attached so that the center of the mass of the entire floating assembly is below the needle point of column 46 when used in a compass operation and below the axis of column 46 when used for vertical angle measurements.

Figure 5:
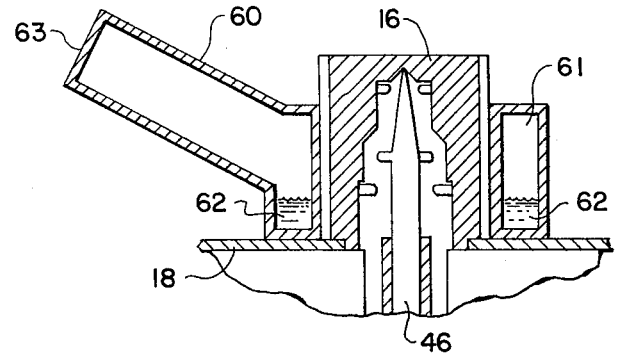
FIG. 5 shows an alternate embodiment for providing the bistable balance operation.

An alternate embodiment for providing the bistable balance is illustrated in FIG. 5. This configuration includes a tubular arm 60 which communicates with a circular arrangement 61 to contain a liquid 62 in either of two stable positions. Portion 61 which surrounds hub 16 is a somewhat doughnut-shaped hollow arrangement with an opening into it for hollow arm 60. Thus elements 60 and 61 comprise a sealed enclosure so that liquid 62 can be in the balancing arrangement for compass operations as shown in FIG. 5 or flow into arm 60 against end 63 so as to provide a vertical reference. Liquid 62 can be any suitable material such as mercury, alcohol or even water. If needed, some additional balancing weight can be added to accommodate the weight of arm 60 when the apparatus is to be used for a compass operation with horizontal orientation as shown in FIG. 5.

It has been found that the angle of orientation of the bistable balance arm for assembly 15 or arm 60 is not critical and theoretically can be anything greater than 0° or less than 90°. A typical such orientation can be between 10° and 15° relative to the plane of disc 18. The main advantage of maintaining this angle as shallow as possible is that it will permit more compact fabrication of the device. Preferably this angle is sufficient to allow ball 50 or liquid 62 to quickly and freely move between the end of the tubular assembly and its position around or over hub 16 when the device is shifted between horizontal and vertical positions. Means for releasably retaining the movable element in either of its stable positions can be included if necessary but will not generally be required.

Figure 6:
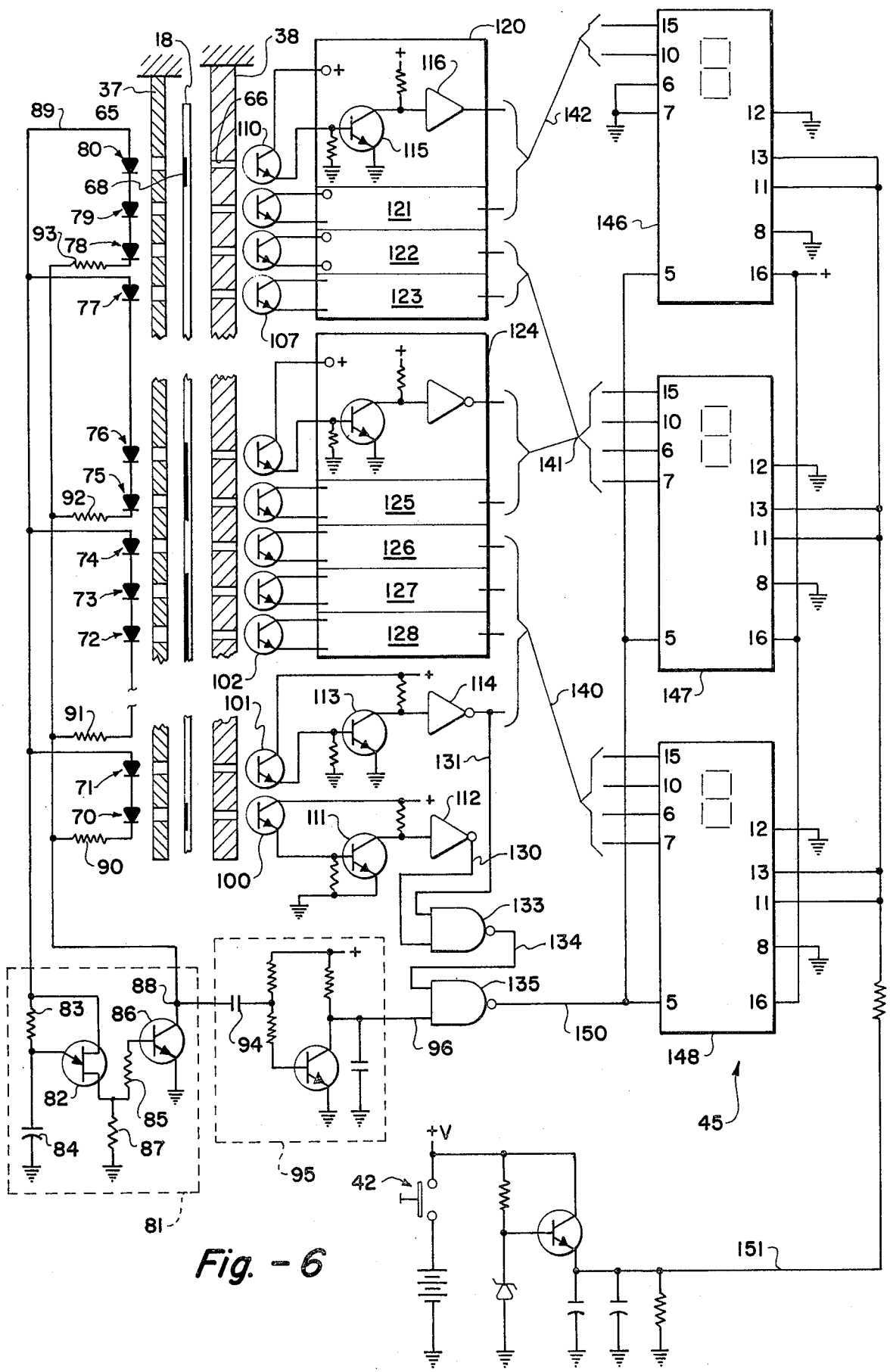
FIG. 6 illustrates the circuitry associated with reading digital data from the pivotally mounted assembly including the interrelationship of the light sources and photosensitive devices.

FIG. 6 illustrates the circuitry for providing a digital display of the instantaneous position for disc 18 relative to the magnetic compass heading or angle of inclination relative to a horizontal plane. FIG. 6 indicates the general physical interrelationship between plates 37 and 38 which include a plurality of aligned apertures such as 65 and 66 with the edge of coded disc 18 passing between these apertures. Disc 18 is generally transparent but includes sequences of opaque areas such as 68. The function of the opaque and transparent areas on disc 18 will be more readily apparent as described subsequently with respect to FIGS. 7 and 8.

The apertures of plate 37 are preferably radially aligned relative to the axis of disc 18 and have a series of light-emitting diodes 70–80 arranged to communicate light into respective such apertures. Pulse generator circuit 81 is arranged to be continuously operational whenever power is applied to the system so as to produce a short pulse having a relatively high peak power but low duty cycle. Unijunction semiconductor 82 which is actuated by the charging and discharging of RC network 83 and 84 drives output amplifier 86 via resistive network 85 and 87. Pulsing circuit 81 permits maintenance of the average power to an acceptable level thereby extending the life of emitters 70–80. It also keeps the average current flowing through these devices to a relatively negligible level so as to minimize any potential negative impact upon the operation of the magnetic compass due to the magnetic field set up by the current.

By using a 2N4871 unijunction for 82, a 33K ohm resistance for 83 with a 1 ufd capacitor 84, 220 ohms for resistor 87 and 47 ohms for resistor 85 and a 2N5190 transistor for 86, the circuit will produce an output pulse of about 0.3 milliseconds out of each 60 millisecond cycle time. Light-emitting diodes 70–80 are typically TIL 24 gallium arsenide emitters and are coupled through impedance matching resistances 90–93 to terminal 88. Although the devices are shown as connected in series of three elements such as 72–74, 75–77 and 78–80, the additional impedance for series connection of 70 and 71 is accommodated by selection of resistor 90 with a higher value than impedance matching resistors 91–93.

Figure 9:
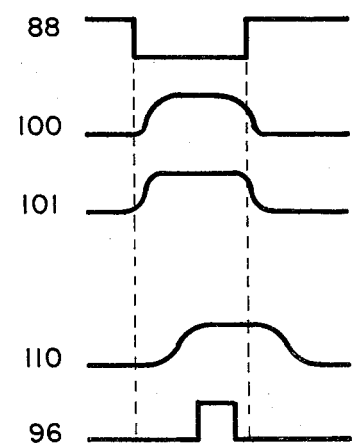
FIG. 9 shows a time-based diagram of the interrelationship between the light energizing pulses and the data strobing pulse.

The energizing pulses produced by pulse generator 81 are coupled through capacitor 94 into pulse shaping and delay circuit 95. As can be seen from FIG. 9, circuit 95 is arranged to produce a strobing pulse at its output terminal 96 which occurs at approximately the midpoint of the pulse at terminal 88 and ceases prior to the end of pulse 88. The output current from phototransistors 100–110 in response to light produced by LED's 70–80 is schematically indicated in FIG. 9 and typically can be expected to vary somewhat as between these devices as is also illustrated in somewhat exaggerated fashion in FIG. 9. Thus by including pulse shaping and delay circuit 95 to produce the output pulses indicated at terminal 96, light will be produced by all of the sources 70–80 and converted to maximum output current by phototransistors 100–110 during the time that strobe pulse 96 occurs.

At the far side of aperture plate 38, a series of phototransistors 100–110 are arranged in alignment with respective apertures such as 66 in plate 38. Aligned light aperture pairs such as 65 and 66 are arranged with sufficient depth and radial spacing so that there will be no unintended cross-coupling of light. Light source 70 will only actuate sensor 100, source 71 will actuate sensor 101, etc. assuming disc 18 is permitting such light passage therethrough. Thus any light permitted to pass by disc 18 is coupled as a signal into cascade connected pairs of amplifiers such as 111–112, 113–114 and 115–116. It should be noted that the detail circuit arrangement shown for block 120 is duplicated for each of blocks 121–128. Typical elements for 100–110 are silicon phototransistor devices TIL 604 while elements such as 111, 113 and 115 can be 2N2483 or similar devices, elements such as 112, 114 and 116 can be 7404 semiconductor inverting amplifiers, and NAND circuits 133 and 135 can typically be 7400 elements.

As will be more apparent in the later discussion of FIGS. 7 and 8, the outputs 130 and 131 of amplifiers 112 and 114 respectively are coupled into circuit 133 which functions as an exclusive-OR (XOR). Thus, exclusive OR 133 will produce an enabling output on line 134 into NAND circuit 135 as long as outputs 130 and 131 are different but will inhibit circuit 135 whenever 130 and 131 are alike. As is known, a NAND gate produces a low output if both inputs are high but a high output if either input is low. Thus, by assuring that the inputs to NAND 133 differ before strobing is permitted, the existence of such differences at the input of 133 will result in a high input 134 for NAND gate 135 so that the output of 135 will drop for the duration of the strobing pulse at input 96 to 135.

It should be recognized that output 130 is used only for strobe control whereas output 131 is combined with the outputs of 128, 127 and 126 to produce a four-bit combination 140 to represent the low order decimal characters to be displayed. Similarly, the outputs of 122–125 are combined to provide the four input bits 141 while amplifier sections 120 and 121 provide two input bits 142. Thus the particular binary coded decimal combination of 140 represents the numbers 0 through 9, the BCD combination at 141 represents tens while the BCD combination 142 represents hundreds. These digital characters are coupled to the display configuration 45 which includes units 146–148. Units 146–148 can typically be TIL 309 display elements with the digital combinations to be displayed being coupled in low order to high order sequence into terminals 15, 10, 6 and 7 thereof. Display element 146, being employed only for displaying hundreds, need only have low order inputs 15 and 10 and thus higher order inputs 6 and 7 are grounded as shown. Display elements 146–148 include gated internal buffering and decoding for energizing the actual visible displays. Thus, by attaching strobe output line 150 to terminal 5 of each of these elements, the digital data present at 140–142 will be transferred and stored within 146–148 and remain continuously available for display until new data is strobed in. Note that TIL 309 types of devices when used for elements 146–148 are strobed by a down level pulse on line 150 from NAND 135. Switch 42 is arranged to couple energizing power over line 151 into 146–148 so that the actual light-emitting elements within 146–148 will not normally be actuated but can be caused to generate a visible display by holding switch 42 in the closed position.

Figure 7:
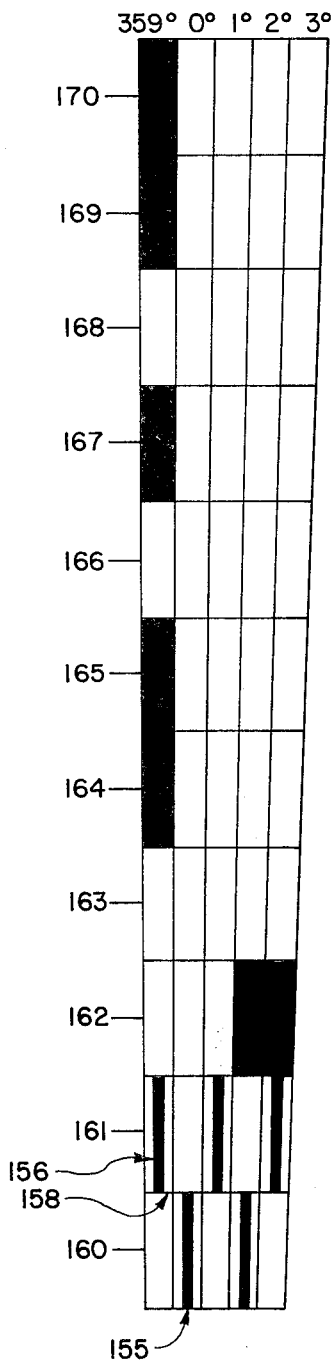
FIG. 7 shows a portion of the position tracking code disc employed in the preferred embodiment.

FIG. 7 illustrates an expanded version of a small segment of coded disc 18. It should be understood that disc 18 is circular and contains a series of circular tracks 160–170 extending along the peripheral edge thereof. FIG. 7 illustrates the configurations of these tracks for 359° through 3°. It should be further understood that FIG. 7 is illustrated as the inverse or negative of the actual disc in that the dark areas shown are actually clear or transparent areas on disc 18 and the areas which are not darkened are opaque sections of the disc. That is, the dark areas as shown in FIG. 7 will produce a ONE in the BCD characters 140–142 of FIG. 6. Tracks 160–170 are preferably arranged with a binary progression as illustrated for certain pertinent degree orientations in FIG. 8. That is, FIG. 8 is a table of essential transition points for establishing the transparent and opaque areas of tracks 160–170 on disc 18 so as to produce the desired digital combinations of ZEROS and ONES at 140–142 from the output of photo transistors 100–110. Thus it can be seen that sensors 101–104 produce a binary sequence which recycles for every 10° while sensors 105–108 produce binary sequences which recycle for every 100° and sensors 109–110 produce a binary sequence associated with the hundreds to be displayed. It will be readily understood by those having normal skill in the art that a coded disc can be produced by drawing an arrangement of channels as generally illustrated in FIG. 7 following the general criteria suggested by FIG. 8 so as to produce a negative of the desired disc. This negative can then be employed to produce a positive disc via well-known photographic means or the like. However, the same result as is accomplished by the FIG. 6 circuitry can be obtained by having the darkened area opaque but including an additional inverter stage in series with each sensor 100–110.

FIG. 7 further illustrates the interrelationships of channels 160 and 161 so as to insure that binary characters will be strobed into the display units only when there is proper alignment in a radial direction. More particularly, darkened portions 155 and 156 for tracks 160 and 161 (which actually will be transparent areas in the example shown) are arranged around the center of the adjoining degree radii so that there is a gap 158 therebetween. That is, darkened portions 155 and 156 each cover less than a full degree segment of tracks 160 and 161, approximately 80% such coverage having been found to be satisfactory. This insures that there will be some transition area in moving across the boundary between degree segments during which phototransistor sensors 100 and 101 of FIG. 6 will both be producing the same output thus causing exclusive OR circuit 133 to inhibit any strobing via gate 135. Accordingly, alignment of disc 18 with the boundary between two adjoining degree segments will not result in any ambiguous data being coupled to the display devices 45 but the last sensed data bytes 140–142 will continue to be stored by display devices 45 and displayed while switch 42 is actuated until the disc 18 has entered within sufficient tolerance of a degree segment.

By properly aligning bistable balance 15 during assembly, the apparatus thus described can provide an immediately visible digital readout of either the compass heading or the angle of inclination on a particular sighting. Positioning of case 10 so that disc 18 is horizontal results in the data displayed at 45 being in correlation to the compass heading on the particular sight being taken. By orienting case 10 so that the plane of disc 18 is vertical, the balance 15 will produce a plumb vertical reference so that sighting will result in a digital display corresponding to the angle from a horizontal plane.

It should be further appreciated that the device described is well suited for portable operations. The battery power source can be provided either by an attachable separate unit or by including battery mounting means within the case of the device. It should also be recognized that the digital character readout as described could be coupled to other apparatus such as a transmitter for display at a remote location or as the digital input to a data processing system.

The device can be easily adapted to provide a quadrant display if desired. Such displays include some indicator of the particular quadrant involved and 0°–90° indications within that quadrant. Adaptation of the coding shown would be readily apparent since the third display element 146 can be employed to indicate quadrants and this can be performed with the same two output bits 142 of FIG. 6 although arranged to shift to each quadrant change of 90°. Further, disc 18 can be modified to sequence from 0° to 90° and back to 0° for producing the display output characters 140 and 141. Inclusion of switchable decoder circuitry could also permit switching between 360° display and quadrant display if desired. This apparatus is particularly useful for insuring accuracy of reading and particularly well-suited for use in low ambient light conditions such as are encountered in mines or at night. Still further, the device via its unique bistable balancing apparatus permits use as a compass, transit or inclinometer which can be directly read from the dial. This visual usage cannot be degraded by any failure of the electrical components.

Although the present invention has been described in considerable detail relative to the preferred embodiment, various modifications, changes and additions will be readily apparent to those having normal skill in the art without departing from the spirit of this invention.

What is claimed is:

1. Apparatus for providing digital bytes or characters of output data comprising:
    a data source including a pair of tracks and a plurality of additional tracks with each of said tracks being composed of a sequence of cells containing indicia representing digital information with the said cells of respective said tracks being laterally aligned by forming multi-bit characters, said pair of tracks being arranged so that the indicia contained therein differs for at least a substantial portion around the center of said cells thereof for a given lateral alignment, one of the indicia for said pair of tracks for a given lateral alignment being substantially centered in the cell thereof with a width less than the width of the said cell containing said one indicia, a plurality of sensors for detecting the indicia from said tracks including first and second sensors for detecting indicia from respective tracks of said pair and for producing first and second output signals corresponding thereto, means for producing an enabling signal whenever said first and second output signals differ, and gating means responsive to said enabling signal for reading multi-bit characters from at least some of said tracks, whereby relative motion between said sensors and said tracks will not result in character reading ambiguities around the lateral boundaries between said cells.

2. Apparatus in accordance with claim 1 wherein said one of the indicia is located in alternate said cells of said pairs of tracks for any two adjoining lateral alignments.

3. Apparatus in accordance with claim 1 wherein said data source includes means having transparent and opaque portions for providing said indicia, said apparatus further including light source means arrayed for transmitting light through the transparent portions of said data source, said sensors including a plurality of light sensitive devices for detecting light transmitted through respective said tracks.

4. Apparatus in accordance with claim 3 which further includes means for actuating said light source means with relatively short duty cycle pulses, said gating means being responsive to the concurrence of said enabling signals and said short duty cycle pulses for reading multi-bit characters from said tracks.

5. Apparatus in accordance with claim 4 which further includes means for coupling said short duty cycle pulse to said gating means including means for delaying said pulse coupling for a sufficient time to assure that said light source is fully actuated and for terminating said pulse coupling prior to deactuation of said light source.

6. Apparatus in accordance with claim 5 which further includes means for storing and displaying the multi-digit characters read by said gating means.

* * * * *